(12) United States Patent
Kotzin

(10) Patent No.: US 7,146,189 B1
(45) Date of Patent: Dec. 5, 2006

(54) APPARATUS FOR WIRELESS DEVICE TO ALTER PERFORMANCE OF WIRELESS COMMUNICATION LINK

(75) Inventor: Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/614,161

(22) Filed: Jul. 11, 2000

(51) Int. Cl.
*H04B 1/38* (2006.01)

(52) U.S. Cl. ............................ 455/557; 455/572

(58) Field of Classification Search ............... 455/557, 455/550, 569, 575, 418, 558, 571, 572, 90, 455/422; 375/222, 285; 235/462.46; 710/1
See application file for complete search history.

(56) References Cited

U.S. PATENT DOCUMENTS

| | | | | |
|---|---|---|---|---|
| 5,322,991 A * | 6/1994 | Hanson | ............... | 235/462.46 |
| 5,509,050 A * | 4/1996 | Berland | .................. | 455/557 |
| 5,513,213 A * | 4/1996 | Patel et al. | ............... | 375/222 |
| 5,574,771 A * | 11/1996 | Driessen et al. | ........... | 455/413 |
| 5,657,371 A * | 8/1997 | Suomi et al. | .............. | 455/418 |
| 5,873,045 A * | 2/1999 | Lee et al. | .................... | 455/550 |
| 5,884,191 A * | 3/1999 | Karpus et al. | ............. | 455/557 |
| 5,924,044 A * | 7/1999 | Vannatta et al. | ............ | 455/556 |
| 5,950,124 A * | 9/1999 | Trompower et al. | ........ | 455/422 |
| 6,026,308 A * | 2/2000 | Hsieh | ......................... | 455/557 |
| 6,029,072 A * | 2/2000 | Barber | ...................... | 455/557 |
| 6,064,857 A * | 5/2000 | Wiedeman et al. | ...... | 455/127.4 |
| 6,073,031 A * | 6/2000 | Helstab et al. | ............. | 455/557 |
| 6,085,078 A * | 7/2000 | Stamegna | ................... | 455/345 |
| 6,192,255 B1* | 2/2001 | Lewis et al. | ................ | 455/558 |
| 6,212,403 B1* | 4/2001 | Ushiroda | .................... | 455/557 |
| 6,226,529 B1* | 5/2001 | Bruno et al. | ................ | 455/557 |
| 6,230,214 B1* | 5/2001 | Liukkonen et al. | ........... | 710/1 |
| 6,317,597 B1* | 11/2001 | Baker et al. | ................ | 455/426 |
| 6,336,038 B1* | 1/2002 | Nojima et al. | ............. | 455/557 |

* cited by examiner

*Primary Examiner*—Temica Beamer
*Assistant Examiner*—Joy Contee
(74) *Attorney, Agent, or Firm*—Randall S. Yaas; Lawrence J. Chapa

(57) ABSTRACT

An apparatus for providing additional processing power to a portable, wireless, communication device. The apparatus includes a housing detachably connectable to the portable, wireless, communication device and digital circuitry carried by the housing. The digital circuitry operable to assist electronic components of the portable, wireless, communication device in processing digital information to increase a data rate of a wireless communication link.

10 Claims, 2 Drawing Sheets

APPARATUS FOR WIRELESS DEVICE TO ALTER PERFORMANCE OF WIRELESS COMMUNICATION LINK

FIELD OF THE INVENTION

This invention generally relates to a portable, wireless, communication device. More specifically, this invention relates to a portable, wireless, communication device with a detachably connectable accessory to facilitate use of higher data rates.

BACKGROUND OF THE INVENTION

Wireless communication devices such as cellular telephones have inherent limitations due to their small size. For example, a cellular telephone battery is capable of delivering a finite amount of power for a limited amount of time. Another limitation is functionality of the telephone due to the limited processing power available from the cellular telephone circuitry such as the microprocessor, digital signal processor (DSP), and digital memory. These limitations will hinder the ability of current cellular telephone technology from providing the very high data rate services associated with third and fourth generation cellular telephone services and applications.

In one prior art embodiment, a cellular telephone power supply accessory converts AC power from a conventional AC power outlet to DC power. The cellular telephone is connected to the power supply to charge the battery, and the cellular telephone can be operated while it is connected to the power supply. However, this only supplements the DC power requirement of the telephone and does not facilitate the use of higher data rates and does not increase the signal processing capability of the telephone.

More complex cellular telephone extension kits effectively totally replace the cellular telephone radio electronics with another radio having greater processing power. However, this is a total replacement of the cellular telephone radio with another and is thus costly. Therefore, there is a need for a portable communication device that can handle the increased data rates that will soon be necessary for future generation wireless data applications. There is a further need for a cellular telephone capable of adaptable performance depending upon its configuration.

BRIEF DESCRIPTION OF THE DRAWINGS

In the drawing figures, like numerals represent like components.

DETAILED DESCRIPTION OF PREFERRED EMBODIMENTS

Figure 1:
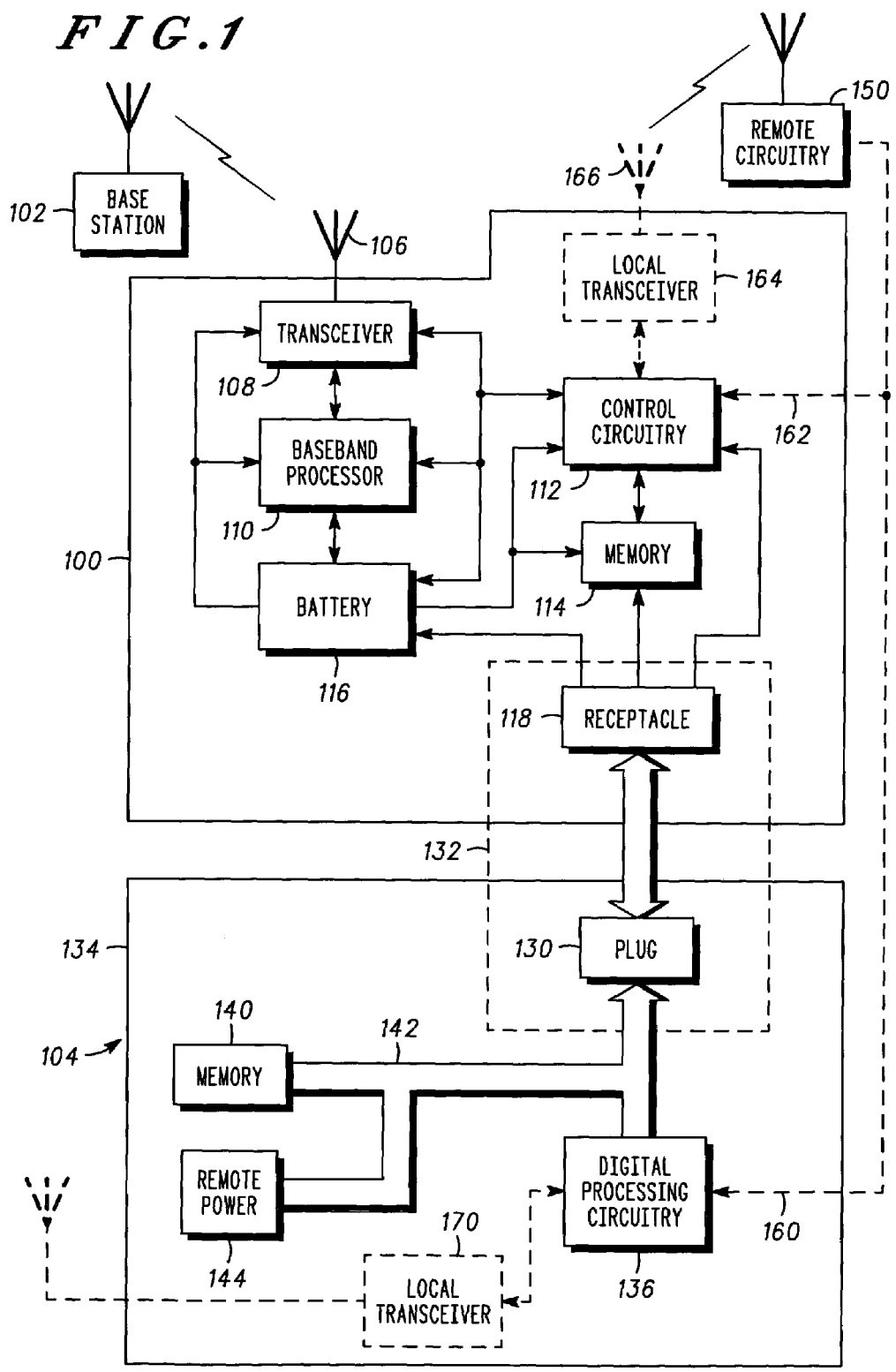
FIG. 1 is a block diagram of a cellular telephone in communication with a base station and coupled to a remote processing block in accordance with the present invention.

FIG. 1 is a block diagram of a portable, wireless, communication device, here cellular telephone 100, in communication with a remote base station 102 and coupled to a remote processing block 104. The remote processing block 104, as will be explained in further detail, is an apparatus for providing additional processing power to the cellular telephone 100. Depending upon the embodiment, the additional processing power can comprise any of DC power, memory, and digital data processing capability.

The cellular telephone 100 includes an antenna 106 for detecting and transmitting radio frequency (RF) signals. Conventional cellular transceiver 108 is operational to transmit information and process detected signals. The cellular transceiver 108 includes standard components such as down-conversion mixers, filters, and amplifiers for the receiver, and standard components such as up-conversion mixers, filters, and amplifiers for the transmitter.

Baseband circuitry 110 processes baseband information for transmission and processes down-converted signals received from the receiver within the transceiver 108. For example, if the cellular telephone 100 comprises a code division multiple access (CDMA) telephone, the baseband processor 110 includes a searcher receiver to process pilot signals and a RAKE receiver to demodulate spread spectrum information signals as is known in the art. Alternatively, the cellular telephone can be configured for a time division multiple access (TDMA) cellular system, and the baseband processor processes received time slots of information.

Control circuitry 112 is for processing received information as well as user input information, and controls functionality of the cellular telephone 100. The control circuitry includes any of a microprocessor, a digital signal processor (DSP), and/or a micro-controller. As will be explained in further detail, the control circuitry 112 is configured to share or offload some of the digital processing necessary to decode information signals resulting from the communication link with the remote base station 102. Moreover, sharing the processing load with remote, additional circuitry allows the cellular telephone 100 to communicate with the remote base station at a higher data rate than would otherwise be possible if the control circuitry 112 did not share its processing tasks.

The memory 114 is for storing received data, data to be transmitted, and telephone operating code. The memory 114 includes any of read only memory (ROM) and random access memory (RAM) as is known in the art. In one embodiment, the memory 114 is adapted to share its memory requirements with remote memory to increase the processing capability of the cellular telephone 100. A conventional cellular telephone battery 116 is generally for supplying power to the components of the cellular telephone 100.

The cellular telephone 100 also includes receptacle 118 for connection to the remote processing block 104. The receptacle has multiple wire connections with the components of cellular telephone 100, and the wire connections depend upon what tasks the cellular telephone 100 is configured to share with the remote processing block 104.

The receptacle 118 is keyed to receive a plug 130 of the remote processing block 104. The receptacle 118 and plug 130 combination is referred to as an interconnect 132. The interconnect 132 is adapted to mechanically and electrically couple the cellular telephone 100 to the remote processing block 104 to assist in transferring information between the cellular telephone 100 and the remote processing block 104. In an alternate embodiment, the components of the interconnect 132 are interchanged so that the plug 130 is connected to the cellular telephone 100 and the receptacle 118 is connected to the remote processing block 104.

The remote processing block 104 includes a housing 134 detachably connectable to the cellular telephone 100. The housing 134 carries digital processing circuitry 136, and the digital processing circuitry 136 is in signal communication with electronic components of the cellular telephone 100 when the housing 134 is coupled to the cellular telephone 100.

The digital processing circuitry 136 is operational to provide different functionality of the cellular telephone 100. For example, this different functionality can be an alternate mode of operation of the cellular telephone, such as a different maximum rate of communication via the communication link with the remote base station 102. Thus, the cellular telephone 100 communicates with the base station 102 at a first data rate when the cellular telephone is not coupled to the remote processing block 104. This could be, for example, when the communication involves primarily voice information. The cellular telephone 100 can also communicate with the base station 102 at a second rate, the second rate faster than the first rate, when the cellular telephone 100 is coupled to the remote processing block 104. This second rate can be, for example, when the communication link involves the transfer of data rather than primarily voice information. This can encompass the downloading or uploading of digital imagery, web page/internet content, data or text file data such as a spreadsheet or email content, or even facsimile transmission data.

The digital processing circuitry 136 comprises any of a microprocessor, a digital signal processor, a micro-controller, and digital logic circuitry. When the remote processing block 104 is coupled to the cellular telephone 100, the control circuitry 112 provides an indication to the remote processing block 104 of the type of communication link between the cellular telephone 100 and the base station 102. This can include any of a type of cellular modulation involved, timing and synchronization information, the data rate and bandwidth, and cellular telephone time slot and frame structure. This type of shared information is by way of example only. Those skilled in the art can envision other types of shared information without the use of the inventive faculty.

One example of the type of information that is shared between the cellular telephone 100 and the remote processing block 104 relates to the type of modulation involved with the communication link between the cellular telephone 100 and the base station 102. Thus, when the communication link comprises a CDMA communication link, the control circuitry 112 can provide the digital processing circuitry 136 with identity information such as a pseudo-random noise (PN) code and system timing. The digital processing circuitry 136 is configured to provide processing support to the cellular telephone 100 for increasing the maximum rate of communication possible with the base station 102. For example, in future generation CDMA cellular telephone systems, the cellular telephone will be required to operate at multiple date rates. A first data rate would be on the order of 64 Kbps, a second data rate of 144 Kbps, and a third data rate of 386 Kbps. For the higher data rates, the digital processing circuitry 136 of the remote processing block 104 is operational to assist in performing the data processing.

Still further, the digital processing circuitry 136 can include additional RAKE demodulator fingers for CDMA demodulation. In this manner, more multi-path rays can be demodulated to reduced bit error rate performance and to even combine multi-path demodulated signals. The additional processing circuitry can also include additional RAKE demodulation circuitry to assist in concurrent communication with multiple base stations as is known in the art.

Increasing the processing capability of received signals is a method of improving the spectrum efficiency of a CDMA cellular system. This is because for a set of base stations transmitting at a defined average power, the bit error rate performance of the mobile stations receiving the transmitted signals improves with the additional processing power supplied by the remote processing block 104. The base stations could actually lower their average transmitted power without a reduction in bit error performance on the forward link. The interference resulting from base station transmissions is reduced and the capacity of the cellular system is increased as is known to those skilled in the art. The remote processing block 104 thus enables an increase in the capacity of a cellular telephone system.

When the cellular telephone 100 is configured to operate in a TDMA system, the control circuitry 112 provides the digital processing circuitry 136 with time slot and frame structure information necessary for communication with the base station 102. This information includes the number and identity of time slots in which the digital processing circuitry 136 is to process. In that instance, the cellular telephone 100 is adapted to process a first set of predetermined time slots of information when the cellular telephone 100 is not coupled to the remote processing block 104, and the digital processing circuitry 136 is adapted to aid the cellular telephone 100 in processing data using a second set of predetermined time slots of information. The second set of time slots is greater in number than the first set of time slots, and thus at least one time slot of the second set is different from the time slots of the first set.

Multiple time slot assignment to a single cellular telephone is exemplified in proposals for next generation cellular standards known as General Packet Radio Service (GPRS) and Enhanced Data rates for Global Evolution (EDGE) to those skilled in the art of cellular telephony. GPRS is a wireless packet data service standardized into the Global System for Mobile communications (GSM) cellular telephone standard. GPRS offers a peak data rate of around 144 Kbps. Commercial cellular telephones under what is commonly referred to as medium radio conditions are projected to offer an average data rate of 50 Kbps.

EDGE is the next phase of the GSM standard, and it will be used to serve higher bit rates. The peak bit rate is around 384 Kbps. Under normal radio conditions, projections indicate an average data rate of around 150 Kbps.

In operation, the GSM cellular standard, and its derivatives in various parts of the world, utilizes TDMA combined with frequency division multiple access (FDMA). One physical channel uses 200 KHz and is shared in time between eight time slots. The GSM standard incorporates Gaussian Minimum Shift Keying (GMSK) modulation, and one symbol represents one bit, yielding a raw bit rate of 25 Kbps per timeslot. The usable bit rate per timeslot is actually lower since channel coding and several headers and control bits are added by the different radio interface layers. For example, in the original GSM implementation the maximum user bit rate is 9.6 Kbps on one timeslot, and each cellular telephone is assigned one time slot.

In GPRS, more optimized channel coding with low error protection reaches a data rate of up to 21 Kbps per timeslot. Moreover, higher bit rates can be reached in GPRS by allocating several timeslots (up to eight) to one cellular telephone user. In this implementation, the remote processing block 104 provides the additional digital processing circuitry to assist in processing the additional time slots. Thus, some of the time slots are processed by the cellular telephone 100, and the remainder of the assigned time slots are processed by the remote processing block 104.

To increase the maximum data rate even further, EDGE was added to the GSM standard. For EDGE, the radio modulation was changed to eight phase shift keying (8-PSK) modulation. One symbol represents three bits. Thus, as a first order comparison, GMSK utilizes minimum shift keying with constant amplitude, while 8-PSK utilizes phase shift keying plus amplitude modulation. The same burst carrying 116 useful symbols can now carry 348 bits. This results in a data rate of 61 Kbps per time slot.

Since amplitude modulation generally suffers from low robustness, EDGE includes an improved radio link control using a technology referred to as incremental redundancy. In incremental redundancy, the cellular telephone 100 receives digital information from base station 102. If the cellular telephone 100 cannot recognize or decode the received information (e.g. due to errors resulting from amplitude distortion), the base station 102 does not re-send the same information over again. Rather, the base station 102 sends additional, incremental information to supplement the information that was already transmitted. This procedure continues until the cellular telephone 100 has received sufficient incremental information to recognize and decode the information. Alternatively, the original block of information is resent with a different puncturing scheme. The receiver within the transceiver 108 along with control circuitry 162 are then able to combine both blocks and try, bit per bit, to determine the correction information. This can be repeated several times using different puncturing schemes as is known in the art.

Therefore, for a TDMA implementation, the digital processing circuitry is configured to aid in processing multiple time slots assigned to the cellular telephone 100. Furthermore, to perform incremental redundancy, the cellular telephone 100 must contain sufficient memory to store the original as well as the incremental information that is transmitted to the cellular telephone 100. To relieve the cellular telephone 100 from having to carry all of the memory required, some of the memory is contained in remote processing block 104 so that the remote processing block 104 includes additional memory 140 for supplementing the memory 114 of the cellular telephone 100. Note that the data transfer between components of the remote processing block 104 is accomplished via a digital bus 142.

As a further example of the sharing of processing tasks, the digital processing circuitry 136 can be configured to perform a digital compression algorithm such as V.42 as is known in the art. The V.42 algorithm is especially useful for compression of text information. The remote processing block 104 can contain the circuitry to operate the compression algorithm so as to relieve the control circuitry 112 of the cellular telephone 100 from having to perform those tasks. In this way, the DSP of the control circuitry 112 is relieved of the many operation cycles that is otherwise required to perform the V.42 algorithm.

The remote processing block 104 additionally enhances the performance of the cellular telephone in relation to internet content data transfer between the cellular telephone 100 and the base station 102. The control circuitry 112 provides internet protocol information to the digital processing circuitry 136, and the digital processing circuitry 136 comprises circuitry to process digital images or web page content to improve downloading and uploading data transfer rates. The memory 140 provides additional digital storage space to facilitate the transfer of large files to and from base station 102.

Still further, the remote processing block 104 can optionally include a remote power source 144. The remote power source 144, for example, can comprise a battery for powering both the components of the remote processing block 104 and for providing additional power to the cellular telephone 100. The additional power allows for a changing in the functionality of the cellular telephone 100. This is especially important to make possible an increase in the cellular telephone 100 radio frequency transmission power. It is well known that given an amount of power to transmit a information at a rate X and at a distance R, to equivalently transmit that information at a rate M times greater than rate X over the same distance of R, the cellular telephone 100 requires M times the power. The remote power source 144 provides that additional power either through increased available current density or increased voltage headroom.

For example, in one embodiment the battery 116 is configured to provide a maximum voltage potential of 3.6 volts. When the cellular telephone 100 is coupled to the remote processing block 104, the remote power source 144 provides the cellular telephone 100 with a voltage higher than 3.6 volts, such as 5.4 volts or 7.2 volts. When the cellular telephone is coupled to the remote processing block 104, the control circuitry 112 recognizes the configuration and provides an indication to the circuitry of the cellular telephone that a higher voltage level is available.

The increased DC power enables the ability to process multiple time slots of information or a higher bandwidth of information. Additionally, the increased DC power allows the cellular telephone 100 to transmit at a higher average transmit power. Thus, the ability to transmit at a higher average transmit power allows the cellular telephone to switch from a first data rate of communication with the base station 102 to a second, higher data rate while still maintaining an acceptable bit error rate performance.

Furthermore, the higher voltage level provides additional resolution in digital-to-analog and analog to digital conversions. The power amplifier is adapted to operate via multiple voltage levels so that improved power amplifier performance is available at the higher voltage level. Improved gain control of analog signals is available due to the higher voltage range. A wider tuning range is available for automatic frequency control due to the higher voltage range.

In one embodiment, the cellular telephone 100 provides an indication to the base station 102 of the configuration (also referred to as a mode) of the cellular telephone. In a first configuration (mode), the cellular telephone 100 operates without being coupled to the remote processing block 104. The cellular telephone 100 transmits a message to the base station 102 via a traffic channel, a control channel, or by some other means as is known in the art, to inform the base station 102 that the cellular telephone 102 is in a standalone mode. The base station 102 then knows the operational capability of the cellular telephone 100 and communicates accordingly. In a second configuration (mode), the cellular telephone 100 is coupled to the remote processing block 104, and the cellular telephone 100 provides an indication to the base station 102 that the cellular telephone 100 is in the second mode of operation with different operating characteristics (e.g. increased data rate capability).

In the illustrated embodiment, the cellular telephone 100 is directly coupled to the remote processing block 104. In an alternate embodiment, the remote processing block 104 is coupled to additional remote circuitry 150 through line 160. For example, the remote circuitry 150 can comprise a conventional computer, and the digital processing circuitry 136 can be configured to perform the V.42 algorithm so as to offload that processing task from both the cellular telephone 100 and the remote circuitry 150. It will be obvious to those skilled in the art that digital processing circuitry 136 can be configured to perform additional digital processing duties for remote processing circuitry 150 other than digital compression. In yet another alternate embodiment, the remote circuitry 150 is coupled directly to the cellular telephone 100 via line 162 while the cellular telephone 100 is coupled to the remote processing block 104.

In another alternate embodiment, the interconnect system between the cellular telephone 100 and the remote processing block 104 comprises a wireless link such as a radio frequency (e.g. spread spectrum) short range link or an infrared link. Thus, the cellular telephone 100 contains a separate transceiver 164 and antenna 166 for a wireless link with remote processing block 104. Likewise, the remote processing block 104 carries a wireless transceiver 170 to form the interconnect with the local transceiver 164 of the cellular telephone. Still further, at least some of the circuitry of transceiver 108 of the cellular telephone 100 is used to perform the functions of local transceiver 164, and a single antenna 106 can be used to communicate with both the base station 102 and the remote processing block 104.

In another alternate embodiment, the local transceiver 164 of the cellular telephone 100 forms a wireless link with remote circuitry 150 while the cellular telephone 100 is also coupled to remote processing block 104.

Figure 2:
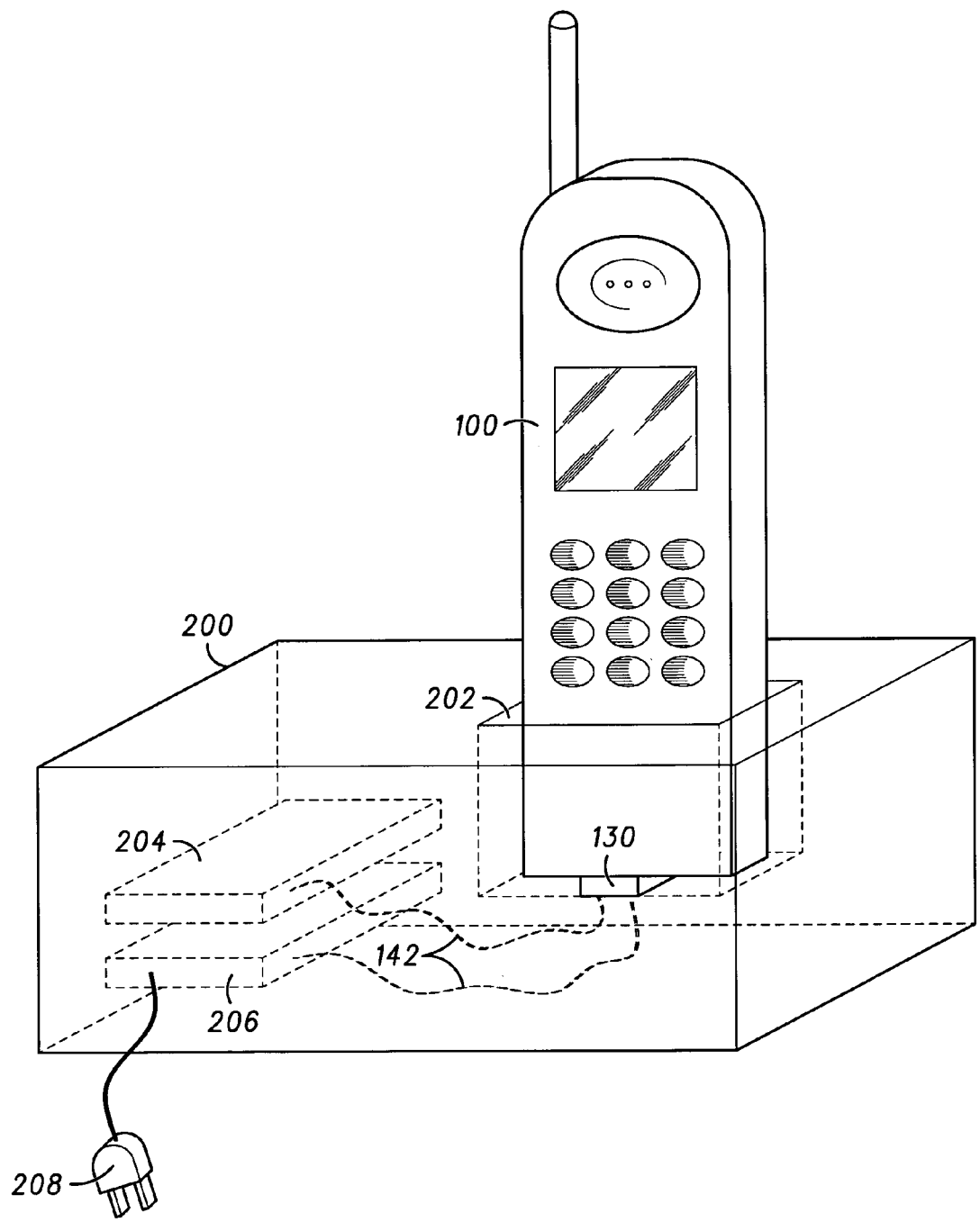
FIG. 2 is a representation showing the cellular telephone of FIG. 1 coupled to a cradle that contains the remote processing block of FIG. 1.

FIG. 2 is a representation of one embodiment of the remote block processing block 104 coupled to the cellular telephone 100. In this embodiment, the remote processing block comprises a cradle 200. The cradle 200 is formed to have a cavity 202 and the cellular telephone 100 is insertable into the cavity 202. A printed circuit board (PCB) 204 carried by the cradle 200 includes the digital processing circuitry 136 (FIG. 1). The PCB 204 can additionally include the memory 140 (FIG. 1) and a power supply 206. When the power plug 208 is plugged into a conventional AC power outlet (not shown), the power supply 206 converts the AC power to a DC power at the proper voltage level to power both the components within the cradle 200 and to supplement the power supplied to the components of the cellular telephone 100 as previously described.

The previous description of the preferred embodiments are provided to enable any person skilled in the art to practice the preferred embodiments. Various modifications to these embodiments will be readily apparent to those skilled in the art, and the generic principles defined herein may be applied to other embodiments without the use of the inventive faculty. For example, in the illustrated embodiment, the remote processing block 104 is shown as a cradle. In an alternate embodiment, the remote processing block 104 is a computer or other electronic equipment that carries additional digital processing power to facilitate higher data rates of wireless communication via a cellular telephone. In yet another alternate embodiment, the remote processing block 104 comprises a portable, handheld device so that a user can couple the his or her cellular telephone to the remote processing block and still maintain a portable implementation. Moreover, the illustrated embodiment shows a cellular telephone coupled to a remote processing block. In an alternate embodiment, the cellular telephone is a portable wireless communication device such as any of a two-way radio and a personal digital assistant (PDA).

I claim:

1. A cellular telephone comprising:
a battery detachably connectable to the cellular telephone to supply the cellular telephone with power; and
a remote power source detachably connectable to the cellular telephone, wherein the cellular telephone is adapted to sense when the remote power source is coupled to the cellular telephone, the cellular telephone to alter a cellular telephone capability including a rate at which data is transmitted, responsive to sensing the remote power source coupled to the cellular telephone, whereby the cellular telephone, which communicates data at the first data rate, while transmitting, over an air interface independently of the remote power source, is capable of communicating at a higher data rate, while transmitting, only while the remote power source is coupled.

2. The cellular telephone as in claim 1 wherein the battery is operational to deliver a first predetermined voltage level to the cellular telephone, the remote power source operational to deliver a second predetermined voltage level to the cellular telephone, the second predetermined voltage level greater than the first predetermined voltage level.

3. The cellular telephone as in claim 1 wherein the cellular telephone is configured to transmit at a higher average transmit power when the cellular telephone is coupled to the remote power source.

4. A communication assembly, comprising:
a portable wireless communication device including a transceiver for communicating data over a wireless communication link and control circuitry coupled to the transceiver, the control circuitry providing digital data processing to the transceiver, the control circuitry providing digital data processing to the transceiver sufficient to enable the transceiver to communicate data via the wireless communication link at a first data rate, while transmitting; and
an apparatus detachably coupled to the portable wireless communication device, the apparatus including digital circuitry to couple to the control circuitry via a data bus, the digital circuitry interoperable with the control circuitry to provide additional digital data processing support for the control circuitry via the data bus when the apparatus is coupled to the portable wireless device, whereby the digital circuitry operates with the control circuitry to provide digital data processing to the transceiver sufficient to enable the transceiver to communicate data via the wireless communication link at a second data rate, while transmitting, when the apparatus is connected to the communication device, the second data rate being higher than the first data rate.

5. The communication assembly as defined in claim 4, wherein the control circuitry comprises a first microprocessor.

6. The communication assembly as defined in claim 4, wherein the digital circuitry comprises a second microprocessor, the data bus connected between the first and second microprocessors when the apparatus is coupled to the wireless communication device.

7. The communication assembly as defined in claim 4, wherein the apparatus further includes a power source to couple to the communication device, the power source providing additional power when the apparatus is coupled to the wireless communication device.

8. A method of controlling a transceiver in a portable wireless communication device, the method comprising the steps of:
transmitting and receiving wireless communication data from a wireless communication device in a transceiver;
data processing information for transmission and reception via the transceiver in a first processing circuitry in the wireless communication device when an external apparatus is not connected to the wireless communication device, the first processing circuitry enabling wireless data communication via the transceiver at a first data rate, while transmitting; and cooperative data processing in both the first processing circuitry and a second processing circuitry in an external apparatus information for transmission and reception via the transceiver when the external apparatus including the second processing circuitry is coupled to the communication device, the co-processing enabling wireless data communication via the transceiver at a second data rate, while transmitting, that is higher than the first data rate.

9. The method as defined in claim 8, wherein said step of cooperative processing comprises sharing in the first processing circuitry and the second processing circuitry at least one of coding and decoding of the signals communicated on the communication link when the external apparatus is coupled to the wireless communication device.

10. The method as defined in claim 8, wherein said step of cooperative processing comprises the first processing circuitry providing internet protocol information to the second digital processing circuitry, and the second processing circuitry processing at least one of digital images and web content.

* * * * *